Patented Jan. 17, 1939

2,144,487

UNITED STATES PATENT OFFICE 2,144,487

PROCESS OF CARROTING ANIMAL FIBER AND THE LIKE AND COMPOSITION THEREFOR

Constantine F. Fabian, Brookfield, Conn., and Alexander N. Sachanen, Woodbury, N. J., assignors to The Non-Mercuric Carrot Company, Danbury, Conn., a corporation of Connecticut No Drawing. Application October 17, 1938, Serial No. 235,482

9 Claims. (Cl. 8—112)

This invention relates to the carroting of animal fiber and has for its object the carroting of fur under such conditions and with a solution of such composition that the fur has imparted to it the capacity of producing a strong, firm and tight felt, without impairment of the life and strength of the fibers or undesirable discoloration of the natural color of the hair.

The carroting process as commonly carried out is effected by reactions of a hydrolyzing and an oxidizing nature which are intended to act on the albuminoids of the outer layers of the fiber. In the application of such carroting solutions as commonly carried out, however, this hydrolyzation and oxidization are found to act on the natural pigment which gives the fur its characteristic color and the particles of which are distributed through the fibrils of keratin of which the body of the animal fiber is composed.

This results in the destruction or decomposition of the pigment, leading not only to a detrimental discoloration of the fur but to a weakening of the mechanical structure of the fibers.

For example, with the ordinary mercury-nitrate acid carroting solution white fur turns yellow and dark or gray fur yellow brown or purple red. And in all prior carroting solutions employing strong oxidizers, whether of the mercury-nitric acid type or not, an intensive yellow discoloration is produced.

This discoloration, through the destruction of the natural pigment, is highly objectionable in the subsequent dyeing of the fur and is particularly harmful where the dyes run toward the lighter shades owing to difficulties in securing the true and intended shade of the dyes. The fur, even when dyed dark brown or dark blue shades, tends to become dull and out of shade. Light colors, such as "steel", "silvertone", etc., cannot be successfully produced.

This destruction of the pigment is also highly objectionable since it appreciably impairs the quality of the fur for felting. It is well known that fur discolored in carroting results in irregularity in shrinkage, in diminished strength and firmness, and in the life of the resulting felt.

It would appear that the natural pigment is deposited between the fibrils of the keratin lying relatively deep in the fiber body and doubtless penetrating the intermolecular spaces of the colloidal solids of the fiber, so that, besides giving the fur its characteristic color, it serves as a cohesive agent, providing coherence between the fibrils and adding to the life and strength of the fibers. The result is that when the carroting solution destroys or decomposes the pigment, the cohesion of the fibrils is affected and the body of the fiber becomes mechanically weaker. At all events, it has been found that the destruction of the natural pigment in whole or in part is detrimental both to the shrinking capacity of the fur and to the firmness, life and color of the resulting felt.

We have discovered that discoloration of and impairment in the strength of the fur may be avoided by including in the carroting solution, and in the presence of an acid hydrolyzing agent and an oxidizing agent, such substances as preserve the natural pigment against decomposition while permitting the hydrolyzing and oxidizing reactions necessary for carroting to take place, thereby leaving the carroted fur undiscolored and with its characteristic natural color unimpaired in strength.

For such substances, which act as protecting agents for the natural pigment, we have found available low concentrations of certain water-soluble organic dye compounds of high molecular weight, which are stable in the carroting solution and have a direct affinity to animal fibers.

We believe that the decomposition of the natural pigment results mainly from the oxidation of the pigment by the oxidizer in the carroting solution and that the pigment protecting agents referred to act as anti-oxidants, preventing oxidation of the natural pigment while permitting the required carroting action to take place. Whether or not this is the correct explanation, we have found that the treatment of the fur with carroting solutions containing such agents leaves the carroted fur with its natural color unimpaired, so that the felt formed therefrom may be subsequently dyed with the exact desired shades without departure therefrom, without dullness in color, and without yellow or undesirable background. It furthermore leaves the fur without the impairment in strength previously experienced through discoloration, eliminating irregularity in shrinkage, improving the rate of shrinking, and producing a superior, tighter, more durable, and finer felt.

Organic compounds suitable for use are those characterized by having the chromophore group or capable of forming such group with the oxidizer of the carroting solution and further characterized by a salt forming group. Such compounds for use as pigment protecting agents should be water-soluble, of high molecular weight, capable of remaining stable and without decomposition in the presence of the acid hydrolyzing agent and the oxidizer, and having a direct affinity to animal fibers.

All organic compounds as above defined are found to have a tendency to prevent decomposition of the natural pigment and to act in greater or less measure as pigment protecting agents when used in the concentrations and in the manner described.

In actual industrial application we have found most effective in successful commercial carroting and prefer to make use of derivatives of anthraquinone having six hydroxyl groups, derivatives of anthraquinone with partial replacement of hydroxyl groups by amino-groups and sulphogroups, derivatives of anthraquinone containing an additional ring having a nitrogen atom and having quinoline character, derivatives of naphthalene containing a pyronine ring, derivatives of triphenylcarbinol in the sub-classes of derivatives of pararosaniline and rosaniline, and azo-naphthalene derivatives.

As examples of derivatives of anthraquinone there may be instanced the following: Sodium salt of 4:8 diamino-1:5-dihydroxyanthraquinone-2:6-disulphonic acid ($C_{14}H_8N_2O_{10}S_2Na_2$); sodium bisulphite of 1:2-dihydroxyanthraquinone-$\beta$-quinoline ($C_{17}H_9NO_4+2NaHSO_3$); sodium salt of 4:8-diethylamino- 1:5- dihydroxyanthraquinone-2:6-disulphonic acid ($C_{18}H_{16}N_2O_{10}S_2Na_2$); and sodium salt of 1-amino-2-methyl-4-o-sulpho-p-tolylaminoanthraquinone ($C_{22}H_{17}N_2O_5SNa$).

As examples of derivatives of naphthalene there may be instanced the following: Sodium salt of sulphodiethoxydiphenyldiamino-o-carboxydichloro-phenyl-xanthenyl ($C_{36}H_{26}N_2O_8SNa_2Cl_2$); sodium salt of sulphodiphenyl-diamino-o-carboxyphenyl-xanthenyl ($C_{32}H_{20}N_2O_6SNa_2$); and sodium salt of tetraethyldiamino-sulpho-phenyl-xanthenyl sulphonate ($C_{27}H_{29}N_2O_7S_2Na$).

As examples of derivatives of triphenylcarbinol may be instanced the following: Sodium salt of diphenyltriamino-diphenyltolyl-carbinol sulphonic acid ($C_{32}H_{28}N_3O_4SNa$); hydrochloride of tetramethylphenyltriamino - diphenyl - $\alpha$ - naphthyl-carbinol anhydride ($C_{35}H_{32}N_3Cl$); sodium salt of triphenyltriamino-triphenylcarbinol anhydride ($C_{32}H_{25}N_3O_9S_3Na_2$); sodium salt of triphenyltriamino triphenylcarbinol disulphonic acid anhydride ($C_{27}H_{28}N_3O_6S_2Na$); hydrochloride of tetramethylethyltriamino-diphenyl-$\alpha$-naphthylcarbinol anhydride ($C_{29}H_{32}N_3Cl$); and calcium salt of disulphonic acid of m'-hydroxytetraethyldiamino-triphenylcarbinol anhydride $$Ca(C_{27}H_{31}N_2O_7S_2)_2$$

As examples of azo-naphthalene derivatives usable as such pigment protecting agents may be instanced the following: Sodium salt of 3:6 disulpho- 8 -hydroxy-$\alpha$-naphthalene-azo-p-tolyl-$\alpha$-naphthylamine-8-sulphonic acid $$(C_{27}H_{18}N_3O_{10}S_3Na_3);$$

sodium salt of 3:6-disulpho-8-hydroxy-$\alpha$-naphthalene-azo-5-amino-1-naphthol $$(C_{20}H_{13}N_3O_8S_2Na_2);$$

and sodium salt of 3:6-disulpho-8-hydroxy-$\alpha$-naphthalene-azo-phenyl-$\alpha$-naphthylamine-8-sulphonic acid ($C_{26}H_{16}N_3O_{10}S_3Na_3$).

The primary function of such agents is to protect the pigment against decomposition and not to serve as mere dyes and these compounds are usually employed in relatively low concentrations, much less than those employed where these compounds are intended to have dyeing properties. It will also be noted that these dye compounds are utilized in the carroting treatment under conditions which prevent any actual dyeing effect. They are used in the presence of an oxidizer and with the absence of boiling, either of which conditions in the case of this particular class of dyes precludes a permanent dyeing effect on the animal fibers.

We prefer to employ concentrations represented by a range of from 0.05% to 0.3% by weight with respect to the weight of the carroting solution, or in some cases concentrations of less than 0.05% may be employed. In carrying out the present invention as herein described, a slight temporary discoloration or tinge may sometimes be left on the fur, but should this take place, such tinge is easily removed by washing with water, such as the washings to which the formed hats are later subjected. It is to be noted, however, that the protecting agent or dye, in the presence of the other compounds of the solution and in the low concentrations employed, produces no permanent or fixed dyeing effect on the fibers of the fur and no permanently fixed stain or discoloration on the fur, and such protecting agents or dyes, even though producing a temporary discoloration such as referred to, are thus considered to be and are referred to herein as dyes of a "non-dyeing character". The variation in concentration of such agents will depend on the nature of the fur and the character of the natural pigment in the fur. For example, for black or dark fur a greater concentration ordinarily would be used, and for lighter fur a lesser concentration. In some cases a plurality of these pigment protecting agents may be used.

For the hydrolyzing agent there may be used one or more acids, either inorganic or organic, capable of having a hydrolyzing reaction, such, for example, as sulphuric acid, hydrochloric acid, phosphoric acid, nitric acid, acetic acid, etc. In some cases the hydrolyzing agent may comprise a plurality of acids. For the acid hydrolyzing agent in place of the hydrolyzing acids, or in the same solution with such acids, there may be employed suitable acid salts, such, for example, as primary sodium phosphate ($NaH_2PO_4.H_2O$), or sodium bisulphate ($NaHSO_4.H_2O$).

For oxidizers there may be employed one or more of any oxidizing agents which give a sufficiently strong oxidizing action, such, for example, as hydrogen peroxide, persulphates, perchlorates, organic peroxides, etc., Where hydrogen peroxide is employed as an oxidizer, it is desirable to make use of a small quantity of some form of stabilizing agent. Fur on the skins contains more or less dust and even particles of metal accumulated during the preceding processing of the skins. These foreign particles tend rapidly to accelerate the decomposition of hydrogen peroxide, so that when the solution is brushed on the skin the hydrogen peroxide is apt rapidly to decompose, resulting in inadequate and non-uniform oxidation of the fiber. In the presence of certain inorganic and organic stabilizing substances, the rate of decomposition of hydrogen peroxide is greatly decreased, resulting in such stability of the carroting solution that its oxidizing strength on the skins is greatly intensified, the oxidizing action prolonged, and the solution itself can be stored for long periods of time. The stabilizing agents for this purpose are numerous, including, for example, sodium metaphosphate, phenacetin, sodium salicylate, citric acid, urea, etc. These stabilizing agents need be employed in minute percentages only, are without carroting effect, and are added for the sole purpose of stabilizing the hydrogen peroxide. Preferably a combination of two such stabilizers is employed, for example, sodium metaphosphate and phenacetin, or sodium metaphosphate and sodium salicylate, or citric acid and urea.

One or more of the pigment protecting compounds of the nature described may be used effectively with any carroting solution containing a suitable acid hydrolyzing agent and an oxidizing agent. Although, for hygienic reasons, we prefer to employ carroting solutions in which mercury is absent, the pigment protecting agents described may be used in solutions containing mercury with the effect of preventing discoloration and impairment of the fur.

However, we have found that the effectiveness of such pigment protecting agents is materially increased by their presence and action jointly in the same solution with other inhibitors which we have heretofore employed for the checking of excessive carroting actions in the wetting and drying of the fur.

Such inhibiting compounds effective during the wetting of the fur comprise, for example (as described in our prior Patent No. 2,087,854), water-soluble organic, oxygen, nitrogen and sulphur containing compounds, such as alcohol, aldehydes, ketones, carbo-acids, amines, tetrazines and hetero-cyclic compounds, sulpho acids and sulphino acids, present in such amount in the solution as to prevent excessive carroting action on the part of the oxidizing agent and the hydrolyzer.

Inhibiting compounds effective in protecting the fur against excessive carroting during drying and storage (as described in our prior Patent No. 2,048,645) comprise water-soluble substantially neutral salts of strong inorganic acids and strong bases, preferably salts of polybasic inorganic acids and alkali metal or alkaline earths, such as sodium sulphate, potassium chloride, bisodium phosphate, ammonium sulphate, calcium chloride and bisodium sulphate.

Accordingly, for the best carroting effect, resulting in the preservation of the fur in unimpaired condition, with the speediest and most regular rate of shrinkage in the subsequent forming of the felt, and a felt of best quality, we make use in the same solution of the described pigment protecting agents in combination with the other organic and inorganic inhibitors referred to.

In this method of carroting, by the joint action of the inhibitors, the required activity or optimum reaction in the carroting treatment may be had while checking or inhibiting excessive carroting reactions of all kinds, particularly where the hydrolyzing and oxidizing agents are in such concentrations as to be harmful to the fur if used alone, resulting in an unimpaired fur fiber, quick shrinking, strong and durable felt, and improved color of the felted fur in dyeing.

The application to the animal fibers of the carroting solution containing the pigment protecting agent may be carried out in the usual manner, which comprises brushing the solution into the fur while the latter is still on the skin, the solution being maintained at normal room temperature. It may, however, be applied to the uncut fur, or the fur itself, after having been cut from the skin, may have the carroting solution applied by immersing the fur in the same, or otherwise.

The fur carroted as described by brushing is subsequently dried and cut and the cut fur subjected to those processes which, in the case of hat manufacture, for example, include the usual formation of the body or hat, shrinking and sizing in the presents of hot water, the dyeing of the formed and shrunken felt, etc.

This invention will be best understood by the following specific examples of carroting solutions which may be prepared according to the general principles of our invention and intended for application to the animal fibers on the skins. It will be understood that in these examples the carroting composition comprises an equeous solution having 100 parts by weight of water with the chemical substances named, the weights of which are given in percentages of the total weight of the solution.

Example 1

| | Percent |
|---|---|
| Primary sodium phosphate ($NaH_2PO_4.H_2O$) | 18 |
| Nitric acid (Tech. 65%) | 2 |
| Hydrogen peroxide (30%) | 5 |
| Sodium salt of 4:8-diamino-1:5-dihydroxy-anthraquinone-2:6-disulphonic acid ($C_{14}H_8N_2O_{10}S_2Na_2$) | 0.2 |

Example 2

| | |
|---|---|
| Sodium bisulphate ($NaHSO_4.H_2O$) | 22 |
| Ammonium persulphate | 4 |
| Hydrogen peroxide | 4 |
| Sodium bisulphite of 1:2-dihydroxyanthraquinone-$\beta$-quinoline ($C_{17}H_9NO_4+2NaHSO_3$) | 0.1 |

Example 3

| | |
|---|---|
| Nitric acid | 15 |
| Crystalline sodium sulphate | 6 |
| Ethyl alcohol | 4 |
| Sodium metaphosphate | 0.01 |
| Sodium salicylate | 0.05 |
| Hydrogen peroxide | 5 |
| Sodium salt of 1-amino-2-methyl-4-o-sulpho-p-tolylamino-anthraquinone ($C_{22}H_{17}N_2O_5SNa$) | 0.2 |

Example 4

| | |
|---|---|
| Sulphuric acid (Tech. 93%) | 5.5 |
| Crystalline sodium sulphate | 4 |
| Ethyl alcohol | 2 |
| Nitric acid | 1 |
| Hydrogen peroxide | 5 |
| Sodium salt of 4:8-diethylamino-1:5-dihydroxyanthraquinone,- 2:6 - disulphonic acid ($C_{18}H_{16}N_2O_{10}S_2Na_2$) | 0.2 |

Example 5

| | |
|---|---|
| Phosphoric acid | 7 |
| Sulphuric acid | 3 |
| Crystalline sodium sulphate | 4 |
| Acetone | 5 |
| Hydrogen peroxide | 6 |
| Sodium salt of sulpho-diethoxydiphenyldiamino - o - carboxydichlorophenyl - xanthenyl ($C_{36}H_{26}N_2O_8SNa_2Cl_2$) | 0.1 |

Example 6

| | |
|---|---|
| Sulphuric acid | 6.5 |
| Crystalline sodium sulphate | 5 |
| Succinic acid | 2 |
| Hydrogen peroxide | 6 |
| Sodium salt of diphenyltriamino-diphenyltolyl-carbinol sulphonic acid ($C_{32}H_{28}N_3O_4SNa$) (colorless carbinol) | 0.3 |

Example 7

|  | Percent |
|---|---|
| Acetic acid | 9 |
| Sulphuric acid | 2 |
| Crystalline sodium sulphate | 3 |
| Ethyl alcohol | 4 |
| Hydrogen peroxide | 5 |
| Hydrochloride of tetramethylphenyl-triamino-diphenyl-$\alpha$-naphthyl-carbinol anhydride ($C_{35}H_{32}N_3Cl$) | 0.05 |

Example 8

| | |
|---|---|
| Sulphuric acid | 4 |
| Nitric acid | 5 |
| Crystalline sodium sulphate | 4 |
| Ethyl alcohol | 3 |
| Citric acid | 0.05 |
| Urea | 0.05 |
| Hydrogen peroxide | 4.5 |
| Sodium salt of 3:6-disulpho-8-hydroxy-$\alpha$-naphthalene-azo-p-tolyl-$\alpha$-naphthylamine-8-sulphonic acid ($C_{27}H_{18}N_3O_{10}S_3Na_3$) | 0.2 |

This application is a continuation in part of our prior co-pending application, Serial No. 189,614, filed February 9, 1938.

Various changes in and departures from the embodiment of our carroting compositions may be made as the same have been heretofore exemplified, all within the scope of our generic invention, it being understood that the matter heretofore set forth is submitted as illustrative and not in a limiting sense.

We claim:

1. An aqueous carroting solution for treating animal fiber or the like containing, each in the presence of the other, an acid hydrolyzing agent, an oxidizing agent and a protecting agent for the natural pigment, the latter comprising a water-soluble organic acid dye of a non-dyeing character in the presence of other ingredients of the solution, of high molecular weight, having direct affinity to animal fibers, and containing a salt forming group, said protecting agent being stable in said solution and being further characterized by having in said solution the chromophore group, said pigment protecting agent being effective to oppose decomposition of the natural pigment of the fiber.

2. A carroting solution as defined in claim 1, in which the pigment protecting agent is present in a concentration not exceeding by weight 0.3% of the total weight of the solution.

3. A carroting solution as defined in claim 1, in which for the pigment protecting agent there is employed a derivative of anthraquinone.

4. A carroting solution as defined in claim 1, in which for the pigment protecting agent there is employed a derivative of naphthalene containing a pyronine ring.

5. A carroting solution as defined in claim 1, in which for the pigment protecting agent there is employed a derivative of triphenylcarbinol.

6. The process of preparing fur and the like for felting, which consists in brushing the fur with an aqueous carroting solution containing an acid hydrolyzing agent and an oxidizing agent, and protecting the natural pigment in the body of the fur fiber against decomposition under the action of the carroting solution by the presence in the solution of a water-soluble organic acid dye of a non-dyeing character in the presence of the other ingredients of the solution, of high molecular weight, stable in said solution, having direct affinity to animal fibers and containing a salt forming group and characterized by having in said solution the chromophore group.

7. A carroting solution as defined in claim 1, in which for the pigment protecting agent there is employed sodium salt of 4:8-diethylamino-1:5-dihydroxyanthraquinone-2:6-disulphonic acid ($C_{18}H_{16}N_2O_{10}S_2Na_2$).

8. A carroting solution as defined in claim 1, in which for the pigment protecting agent there is employed sodium salt of sulpho-diethoxydiphenyldiamino-o-carboxydichlorophenyl-xanthenyl ($C_{36}H_{26}N_2O_8SNa_2Cl_2$).

9. A carroting solution as defined in claim 1, in which for the pigment protecting agent there is employed sodium salt of diphenyltriamino-diphenyltolyl-carbinol sulphonic acid ($C_{32}H_{28}N_3O_4SNa$).

CONSTANTINE F. FABIAN.
ALEXANDER N. SACHANEN.